(12) United States Patent
Wei et al.

(10) Patent No.: US 10,241,919 B2
(45) Date of Patent: Mar. 26, 2019

(54) DATA CACHING METHOD AND COMPUTER SYSTEM

(71) Applicant: HUAWEI TECHNOLOGIES CO.,LTD., Shenzhen, Guangdong (CN)

(72) Inventors: Wei Wei, Beijing (CN); Lixin Zhang, Beijing (CN); Jin Xiong, Beijing (CN); Dejun Jiang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 52 days.

(21) Appl. No.: 15/347,776

(22) Filed: Nov. 9, 2016

(65) Prior Publication Data

US 2017/0060752 A1    Mar. 2, 2017

Related U.S. Application Data

(63) Continuation of application No. PCT/CN2015/078502, filed on May 7, 2015.

(30) Foreign Application Priority Data

May 9, 2014  (CN) .......................... 2014 1 0193960

(51) Int. Cl.
*G06F 12/0868* (2016.01)
*G06F 3/06* (2006.01)
(Continued)

(52) U.S. Cl.
CPC .......... *G06F 12/0868* (2013.01); *G06F 3/061* (2013.01); *G06F 3/065* (2013.01);
(Continued)

(58) Field of Classification Search
CPC ............. G06F 12/1009; G06F 12/1027; G06F 2212/1024; G06F 2212/684; G06F 3/0608;
(Continued)

(56) References Cited

U.S. PATENT DOCUMENTS 5,542,062 A    7/1996  Taylor et al.
7,457,926 B2  11/2008  Shen et al.
(Continued)

FOREIGN PATENT DOCUMENTS

CN    101105773 A    1/2008
CN    101236530 A    8/2008
(Continued)

OTHER PUBLICATIONS

HanBin Yoon et al. Row Buffer Locality Aware Caching Policies for Hybrid Memories, ICCD, 2012. total 8 pages.
(Continued)

*Primary Examiner* — Zhuo H Li (74) *Attorney, Agent, or Firm* — Conley Rose, P.C.

(57) ABSTRACT

A data caching method and a computer system are provided. In the method, when a miss of an access request occurs and a cache needs to determine a to-be-replaced cache line, not only a historical access frequency of the cache line but also a type of a memory corresponding to the cache line needs to be considered. A cache line corresponding to a DRAM type may be preferably replaced, which reduces a caching amount in the cache for data stored in a DRAM and relatively increase a caching amount for data stored in an NVM. For an access request for accessing the data stored in the NVM, corresponding data can be found in the cache whenever possible, thereby reducing cases of reading data from the NVM. Thus, a delay in reading data from the NVM is reduced, and access efficiency is effectively improved.

17 Claims, 3 Drawing Sheets

(51) Int. Cl.
*G06F 12/122* (2016.01)
*G06F 12/128* (2016.01)
*G06F 12/08* (2016.01)

(52) U.S. Cl.
CPC .......... *G06F 3/0619* (2013.01); *G06F 3/0631* (2013.01); *G06F 3/0685* (2013.01); *G06F 12/08* (2013.01); *G06F 12/122* (2013.01); *G06F 12/128* (2013.01); *G06F 3/068* (2013.01); *G06F 2212/604* (2013.01)

(58) Field of Classification Search
CPC .... G06F 3/0619; G06F 3/0647; G06F 3/0652; G06F 3/0664; G06F 3/0685
See application file for complete search history.

(56) References Cited

U.S. PATENT DOCUMENTS

| | | | |
|---|---|---|---|
| 7,962,695 | B2 | 6/2011 | Faucher et al. |
| 2001/0049770 | A1 | 12/2001 | Cai et al. |
| 2008/0114930 | A1* | 5/2008 | Sanvido .............. G06F 12/0866 711/113 |
| 2009/0043966 | A1 | 2/2009 | Shen et al. |
| 2010/0185816 | A1* | 7/2010 | Sauber ................ G06F 12/0886 711/122 |
| 2011/0307653 | A1 | 12/2011 | Rudelic et al. |
| 2014/0032818 | A1 | 1/2014 | Chang et al. |
| 2016/0062660 | A1 | 3/2016 | Kunimatsu et al. |

FOREIGN PATENT DOCUMENTS

| | | |
|---|---|---|
| CN | 102253901 A | 11/2011 |
| CN | 102667735 A | 9/2012 |
| CN | 102760101 A | 10/2012 |
| CN | 102831087 A | 12/2012 |
| CN | 103092534 A | 5/2013 |
| CN | 103548005 A | 1/2014 |
| CN | 103914403 A | 7/2014 |
| CN | 103927145 A | 7/2014 |
| CN | 103927203 A | 7/2014 |
| CN | 104035893 A | 9/2014 |
| JP | 2011022933 A | 2/2011 |
| JP | 2011258193 A | 12/2011 |

OTHER PUBLICATIONS

Justin Meza et al. Enabling Efficient and Scalable Hybrid Memories Using Fine-Granularity DRAM Cache Management. IEEE Computer Architecture Letters. Jan. 20, 2012. total 4 pages.

Luiz Ramos et al. Page Placement in Hybrid Memory Systems. ICS, May 31-Jun. 4, 2011. total 11 pages.

Gaurav Dhiman et al. PDRAM: A Hybrid PRAM and DRAM Main Memory System. DAC, Jul. 26-31, 2009. total 6 pages.

Rangharajan Venkatesan et al. TapeCache: A High Density, Energy Efficient Cache Based on Domain Wall Memory. ISLPED,12. Jul. 30-Aug. 1, 2012. total 6 pages.

Miao Zhou et al. Writeback-Aware Partitioning and Replacement for Last-Level Caches in Phase Change Main Memory Systems. TACO, vol. 8 Issue 4, Jan. 2012. total 21 pages.

Xiufeng Sui. Adaptive Cache Management Policies for High Performance Microprocessors. University of Science and technology of China a dissertation for doctors degree. Oct. 24, 2010. total 158 pages. with English abstract.

Zhe Wang et al. Adaptive Placement and Migration Policy for an STT-RAM-Based Hybrid Cache. 2014 IEEE. total 12 pages.

Sadegh Yazdanshenas et al. Coding Last Level STT-RAM Cache for High EnduranceAnd Low Power. Published by the IEEE Computer society. 2013. total 4 pages.

Baixing Quan et al. Prediction Table based Management Policy for STT-RAM and SRAM Hybrid Cache. Dec. 2012. total 6 pages.

Wei Wei et al. HAP: Hybrid-memory-Aware Partition in Shared Last-Level Cache. Institute of Computing Technology, Chinese Academy of Sciences y University of Chinese Academy of Scieneces. 2014. total 8 pages.

Qing Wang et al. Efficient Management with Hotspots Control for Hybrid Memory System.Microelectronics & computer vol. 31 No. 1. Jan. 2014. total 4 pages. with English abstract.

Yoon, H., et al., "Row Buffer Locality Aware Caching Policies for Hybrid Memories," ICCD, 2012, 8 pages.

Meza, J., et al., "Enabling Efficient and Scalable Hybrid Memories Using Fine-Granularity DRAM Cache Management," IEEE Computer Architecture Letters, Jan. 20, 2012, 4 pages.

Ramos, L., et al., "Page Placement in Hybrid Memory Systems," ICS, May 31-Jun. 4, 2011, 11 pages.

Dhiman, G., et al., "PDRAM: A Hybrid PRAM and DRAM Main Memory System," DAC, Jul. 26-31, 2009, 6 pages.

Venkatesan, R., et al., "TapeCache: A High Density, Energy Efficient Cache Based on Domain Wall Memory," ISLPED, Jul. 30-Aug. 1, 2012, 6 pages.

Zhou, M., et al., "Writeback-Aware Partitioning and Replacement for Last-Level Caches in Phase Change Main Memory Systems," TACO, vol. 8, No. 4, Jan. 2012, 21 pages.

Sui, X., et al., "Adaptive Cache Management Policies for High Performance Microprocessors," University of Science and Technology of China a dissertation for doctor's degree, Oct. 24, 2010, 158 pages, with English Abstract.

Wang, Z., et al., Adaptive placement and Migration Policy for an STT-RAM-Based Hybrid Cache, IEEE, 2014, 12 pages.

Yazdanshenas, S., "Coding Last Level STT-RAM Cache for High Endurance and Low Power," Published by the IEEE Computer Society, 2013, 4 pages.

Quan, B., et al.,"Prediction Table based Management Policy for STT-RAM and SRAM Hybrid Cache," College of Computer Science, Zhejiang University, Dec. 2012, 6 pages.

Wei W., et al., "HAP: Hybrid-memory-Aware Partition in Shared Last Level Cache," Institute of Computing Technology Chinese Academy of Sciences, University of Chinese Academy of Sciences, 2014, 8 pages.

Wang, Q., et al., "Efficient Management with Hotspots Control for Hybrid Memory Systems," Microelectronics & Computer, vol. 31, No. 1, Jan. 2014, 4 pages, with English Abstract.

* cited by examiner

DATA CACHING METHOD AND COMPUTER SYSTEM

CROSS-REFERENCE TO RELATED APPLICATIONS

This application is a continuation of International Application No. PCT/CN2015/078502, filed on May 7, 2015, which claims priority to Chinese Patent Application No. 201410193960.4, filed on May 9, 2014. The disclosures of the aforementioned applications are hereby incorporated by reference in their entireties.

TECHNICAL FIELD

Embodiments of the present invention relate to storage technologies, and in particular, to a data caching method, a cache, and a computer system.

BACKGROUND

Currently, there are increasingly more data-centered applications, such as Internet applications and big data applications. These applications need powerful storage support.

In the prior art, a dynamic random access memory (DRAM) is generally used in a computer system. However, limited by techniques, the DRAM is relatively small in capacity and consumes relatively much energy, and therefore is difficult to meet a requirement of an application for a large capacity and low energy consumption. Recently, a nonvolatile memory (NVM) has been widely used. Due to advantages of a large storage capacity and low energy consumption, the NVM replaces the DRAM and is used as the computer system, which can meet the requirement of the application for a large capacity and low energy consumption. However, compared with the DRAM, the NVM has a relatively long read/write delay. Because the DRAM and the NVM each have their own advantages and disadvantages, a hybrid memory including the DRAM and the NVM is further used in the prior art, so as to provide a memory with low energy consumption and of a large capacity and high performance for an application.

SUMMARY

Embodiments of the present invention provide a data caching method, a cache, and a computer system.

According to a first aspect, an embodiment of the present invention provides a data caching method applying in a computer system including a processor, a cache, and a hybrid memory. The hybrid memory comprises the memory of the DRAM type and a memory of a nonvolatile memory (NVM) type. According the method, after receiving a data access request sent by the processor, the cache determines whether to-be-accessed data is cached in the cache according to the access address included in the data access request. Then, the cache determines, according to a historical access frequency of a cache line in the cache and a type of a memory corresponding to the cache line, whether a cache line that meets a first preset condition exists in the cache when the to-be-accessed data is not cached in the cache. The cache line that meets the first preset condition comprises a cache line whose historical access frequency is lower than a preset frequency and that is corresponding to a memory of the DRAM type. The cache selects a to-be-replaced first cache line from the cache line that meets the first preset condition when the cache line that meets the first preset condition exists in the cache. After reading the to-be-accessed data from the hybrid memory according to the access address, the cache replace the first cache line with a second cache line and send the to-be-accessed data to the processor, where the second cache line comprises the access address and the to-be-accessed data.

In the embodiments of the present invention, when a miss of an access request occurs and a cache needs to determine a to-be-replaced cache line, not only a historical access frequency of the cache line but also a type of a memory corresponding to the cache line needs to be considered. Therefore, a cache line corresponding to a DRAM type may be preferably replaced, which reduces a caching amount in the cache for data stored in a DRAM. The cache can relatively increase a caching amount for data stored in an NVM. For an access request for accessing the data stored in the NVM, corresponding data can be found in the cache whenever possible, thereby reducing cases of reading data from the NVM, reducing a delay in reading data from the NVM, and effectively improving access efficiency.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
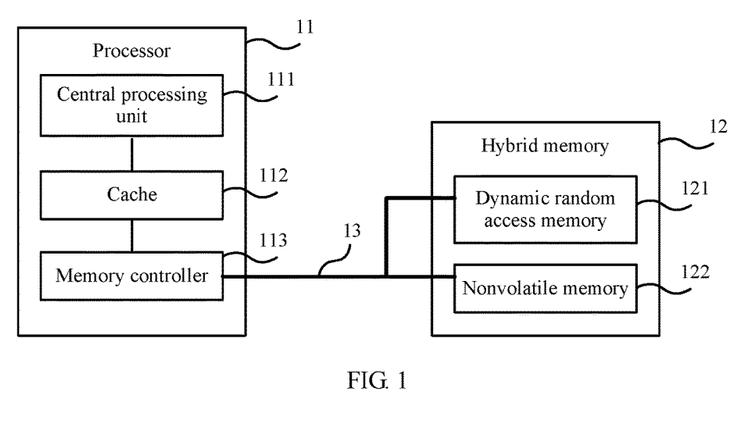
FIG. 1 is an architectural diagram of a computer system according to an embodiment of the present invention.

FIG. 1 is an architectural diagram of a computer system according to an embodiment of the present invention. As shown in FIG. 1, the computer system includes a processor 11 and a hybrid memory 12. The Processor 11 may include a CPU 111, a cache 112, and a memory controller 113; the Hybrid Memory 12 may include a DRAM 121 and an NVM 122. The Processor 11, the Hybrid Memory 12, and the cache 112 are connected by using a bus. The Hybrid Memory 12 and the Memory controller 113 may be connected by using a memory bus 13.

During data access, the CPU may send a data access request to the cache, where the data access request includes an access address. Some data in the Hybrid Memory is cached in the cache to increase a response speed. Therefore, the cache first determines, according to the access address, whether data that the CPU requests to access is cached in the cache. In other words, the cache first determines, according to the access address, whether a hit can occur on the data that is requested to be accessed in the cache. When a hit occurs in the cache, that is, when the to-be-accessed data is cached in the cache, the cache may directly return, to the CPU, the data that the CPU requests to access. When a miss occurs in the cache, that is, when the to-be-accessed data is not cached in the cache, the data access request is sent to the Hybrid Memory by using the Memory controller, so that the data that the CPU requests to access is read from the Hybrid Memory.

Because cache space in the cache is generally relatively small, in a data access process, the cache needs to constantly update cached content in the cache according to access cases, so as to meet changing access requirements. Specifically, when a hit occurs in the cache for a current data access, a cache line is not replaced or updated; when a miss occurs in the cache for the current data access, the cache needs to determine a to-be-replaced cache line from a currently cached cache line, and replace the cache line with a new cache line that is read from the memory.

A person of ordinary skills in the art may know that data exchange between a cache and the memory is executed by using a cache controller. A cache line is the smallest operation unit in the cache Controller. In other words, when the cache Controller writes data into the memory, the cache Controller writes a line of data into the memory in a unit of cache line; when the cache Controller reads data from the memory, the data is read also according to the cache line. For ease of description, in the embodiments of the present invention, one cache line may represent data in one cache line. "Replacing the cache line" in the embodiments of the present invention refers to replacing data in one cache line in the cache with data in one cache line read from the memory. In the foregoing process, the cache searches a currently cached cache line for a cache line with the lowest access frequency, and determines that the cache line with the lowest access frequency is the to-be-replaced cache line. However, the cache does not sense whether a type of a memory corresponding to the to-be-replaced cache line is a DRAM type or an NVM type, that is, does not know whether the to-be-replaced cache line comes from a DRMA or an NVM.

It is discovered from an analysis conducted on the DRAM and several types of NVMs that there is a difference between read/write performance of the DRAM and read/write performance of the NVM. In the embodiments of the present invention, the NVM includes but is not limited to: a phase change memory (PCM), a spin transfer torque-magnetic random access memory (STT-MRAM), and a resistive random access memory (RRAM). The read/write performance of the DRAM and the read/write performance of the NVM may be specifically shown in Table 1.

TABLE 1

|  | DRAM | PCM | STT-MRAM | RRAM |
| --- | --- | --- | --- | --- |
| Read delay | <10 ns | 12 ns | 35 ns | <50 ns |
| Write delay | <10 ns | 100 ns | 35 ns | <0.3 ns |
| Quantity of writes | >1E16 | 1.00E+09 | >1E12 | 1.00E+12 |
| Retention time |  | 64 ms | >10 y | >10 y | >10 y |

It can be learnt from Table 1 that although a storage capacity of the NVM is larger than that of the DRAM and the NVM consumes less energy than the DRAM, a read/write delay of the NVM is longer than that of the DRAM and the NVM has a limitation on a quantity of writes.

Therefore, according to the foregoing prior art, if the type of the memory corresponding to the to-be-replaced cache line determined by the cache is the NVM type, the to-be-replaced cache line is to be deleted from the cache and data needs to be invoked from the NVM of the Hybrid Memory for a subsequent access request. Because the read/write delay of the NVM is longer than that of the DRAM, a problem of an access delay inevitably occurs and a relatively high requirement of an application for an access delay cannot be met.

Therefore, in a method embodiment, when a cache determines a to-be-replaced cache line, not only a historical access frequency of each currently cached cache line needs to be considered, but also a type of a memory corresponding to each cache line needs to be further considered. A cache line corresponding to a memory whose type is a DRAM type is preferably considered, that is, a cache line corresponding to a memory whose type is a DRAM type is preferably replaced. In this way, even if a cache line of a DRAM is deleted from the cache and data needs to be invoked from the DRAM in subsequent data access, an access delay of the DRAM is not extremely long. The cache line corresponding to a memory whose type is the DRAM type represents that data in the cache line is stored in the DRAM of the memory. A cache line corresponding to a memory whose type is an NVM type represents that data in the cache line is stored in an NVM of the memory.

The technical solution of the present invention is described in detail by using the following specific embodiments.

Figure 2:
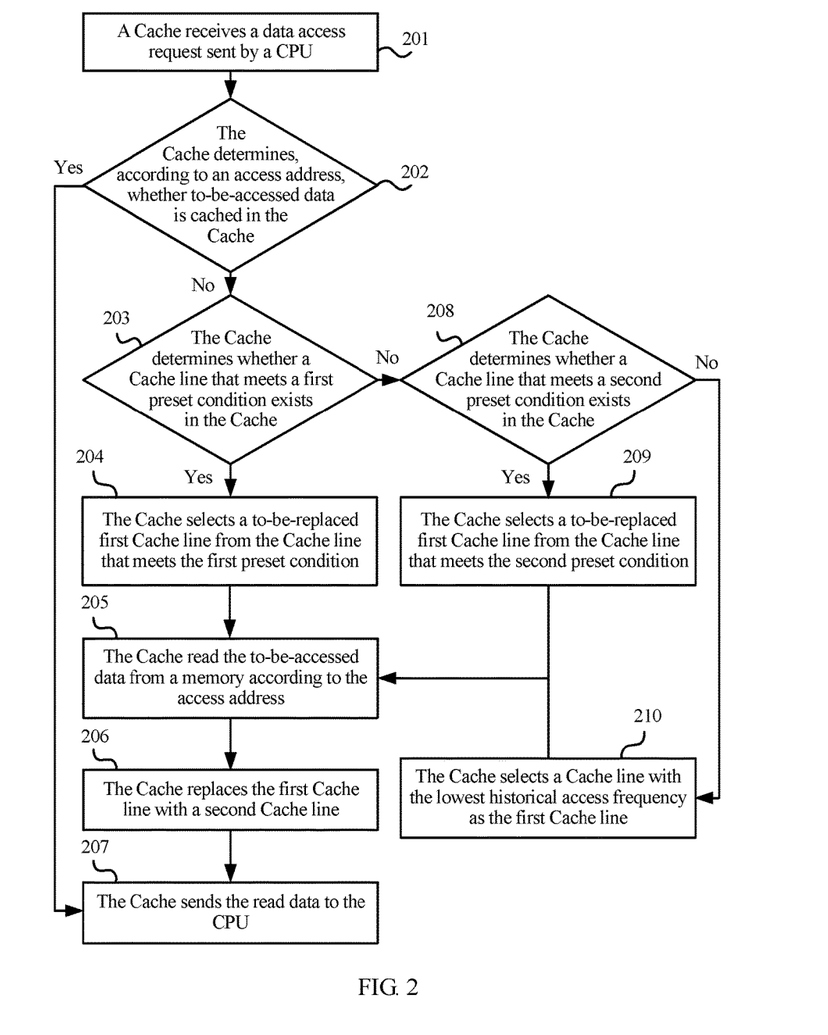
FIG. 2 is a flowchart of a data caching method according to an embodiment of the present invention.

FIG. 2 is a flowchart of a data caching method according to an embodiment of the present invention. The method may be executed by a cache, and specifically by a cache Controller in the cache. As shown in FIG. 1 and FIG. 2, the method in this embodiment may include:

S201. The cache receives a data access request sent by a CPU, where the data access request includes an access address.

S202. The cache determines, according to the access address, whether to-be-accessed data is cached in the cache; if the to-be-accessed data is cached in the cache, S207 is executed, and if the to-be-accessed data is not cached in the cache, S203 is executed.

Specifically, the CPU may receive a data access request sent by an application and send the data access request to the cache. The cache may compare the access address requested by the CPU with addresses of all cache lines cached in the cache, and determine whether the requested data is cached in the cache, that is, whether a hit occurs. In specific implementation, if a mapping strategy of the cache is associative mapping, the cache performs searching and comparison within a whole caching range; if the mapping strategy of the cache is not associative mapping but set-associative mapping, the cache may determine, according to an index bit in the access address, a set to which the access address belongs in the cache, and further determine, according to a tag bit in the access address, whether the access address is included in the set. If the access address is included in the set, the cache may determine, according to a significant bit, whether cached data is valid. If the data is valid, corresponding data may be found according to data offset in the access address and the data is returned to the CPU.

S203. The cache determines, according to a historical access frequency of a cache line in the cache and a type of a memory corresponding to the cache line, whether a cache line that meets a first preset condition exists in the cache; if the cache line that meets the first preset condition exists in the cache, S204 is executed, and if the cache line that meets the first preset condition does not exist in the cache, S208 is executed.

The cache line that meets the first preset condition includes a cache line whose historical access frequency is lower than a preset frequency and that is corresponding to a memory of a dynamic random access memory DRAM type, and the memory includes the memory of the DRAM type and a memory of a nonvolatile memory NVM type.

S204. Select a to-be-replaced first cache line from the cache line that meets the first preset condition.

When the to-be-accessed data is not cached in the cache, that is, a miss occurs, the cache needs to determine a cache line as the to-be-replaced cache line from a currently cached cache line, where the cache line that is determined as the to-be-replaced cache line is the first cache line. When the first cache line is being determined, reference needs to be made to not only historical access frequencies of all currently cached cache lines but also types of memories corresponding to all the cache lines. The historical access frequency of the cache line is used to represent an access temperature of corresponding cached data, and the type of the memory corresponding to the cache line represents whether a source of the cache line is a DRAM or an NVM.

In this embodiment, a strategy for the cache to determine the first cache line may be: replacing, on the basis of the historical access frequency, a cache line corresponding to a memory whose type is the DRAM type whenever possible, that is, preferably replacing a cache line corresponding to a memory whose type is the DRAM type.

For example, the cache may first select several cache lines whose historical access frequencies are lower than the preset frequency from all the cached cache lines, and then determine, according to a type of a memory corresponding to each of the several cache lines, that a cache line corresponding to a memory of the DRAM type is used as the to-be-replaced first cache line. If the several cache lines include two or more cache lines corresponding to a memory whose type is the DRAM type, a cache line whose historical access frequency is the lowest may be determined as the to-be-replaced first cache line.

S205. The cache reads the to-be-accessed data from the memory according to the access address.

After determining the to-be-replaced first cache line, the cache may read the to-be-accessed data from the memory according to the access address, where the to-be-accessed data may be stored in the DRAM or may be stored in the NVM.

S206. The cache replaces the first cache line with a second cache line, where the second cache line includes the access address and the to-be-accessed data.

After reading the to-be-accessed data, the cache may replace the first cache line with the second cache line. It should be noted that, in this embodiment of the present invention, for ease of description, data that is in a cache line and that is read from the memory is referred to as the second cache line. Replacing the first cache line with the second cache line refers to caching, in the cache, the data that is read from the memory, and deleting data in the first cache line or writing data in the first cache line back to the memory. In specific implementation, a location flag bit may be added to each cache line in the cache, and this flag bit is used to identify whether a type of a memory corresponding to the cache line is the DRAM type or the NVM type.

The cache may record, according to a type of a storage medium that is in the memory and that is indicated by the access address, a type of a memory corresponding to the second cache line. In other words, a flag bit can be added to the second cache line. For example, for the flag bit, one bit may be used. When the bit is 1, it represents that a memory type corresponding to the second cache line is the DRAM type, and when the bit is 0, it represents that a memory type corresponding to the second cache line is the NVM type.

When the first cache line is being deleted from the cache, if a modify flag bit of the to-be-replaced first cache line is clean, it represents that the data in the first cache line has not been modified an d is consistent with data stored in the memory. In this case, the data in the first cache line does not need to be written back to the memory, and the data in the first cache line may be deleted directly. If the modify flag bit of the to-be-replaced first cache line is dirty, it represents that the data in the first cache line has been modified and is inconsistent with the data stored in the memory. In this case, the data in the first cache line needs to be first written back to the memory, and then the first cache line is deleted.

S207. The cache sends the to-be-accessed data to the CPU, and the procedure ends.

After completing the foregoing operations, the cache may send, to the CPU, the to-be-accessed data that is read.

In conclusion, in the method in this embodiment, when a miss of an access request occurs and a cache needs to determine a to-be-replaced cache line, not only a historical access frequency of the cache line but also a type of a memory corresponding to the cache line needs to be considered. Therefore, a cache line corresponding to a DRAM type may be preferably replaced, which reduces a caching amount in the cache for data stored in a DRAM. The cache can increase a caching amount for data stored in an NVM, and for an access request for the data stored in the NVM, corresponding data can be found in the cache whenever possible, thereby reducing cases of reading data from the NVM, reducing a delay in reading data from the NVM, and effectively improving access efficiency.

In the foregoing embodiment, the historical access frequencies of all the cache lines may be acquired with the help of a least recently used (LRU) linked list.

Specifically, in the LRU linked list, the cache lines are recorded in ascending order of the access frequencies, and the determining, by the cache, whether a cache line that meets a first preset condition exists in the cache may be specifically:

determining whether a cache line corresponding to the memory of the DRAM type exists in first M cache lines in the least recently used LRU linked list of the cache, where the first M cache lines in the LRU linked list are cache lines whose historical access frequencies are lower than the preset frequency; and when the cache line corresponding to the memory of the DRAM type exists in the first M cache lines in the LRU linked list, selecting, as the first cache line, the first of the determined cache line that is corresponding to the memory of the DRAM type and that is in the first M cache lines.

"The first" refers to a cache line that is of the cache line corresponding to the memory of the DRAM type and that is positioned most forward in the first M cache lines in the LRU linked list.

It should be noted that, if a value of M is set to be relatively large, a probability of replacing the cache line corresponding to a memory whose type is the DRAM type may be increased. However, the value of M cannot be set to be excessively large; otherwise, data stored in the DRAM cannot enter the cache. A person of ordinary skills in the art may set the value of M as required.

S208. The cache determines whether a cache line that meets a second preset condition exists in the cache; if the cache line that meets the second preset condition exists in the cache, S209 is executed, and if the cache line that meets the second preset condition does not exist in the cache, S210 is executed.

The cache line that meets the second preset condition includes an unmodified cache line whose historical access frequency is lower than the preset frequency and that is corresponding to the memory of the NVM type.

Specifically, when the cache determines that no cache line that meets the first preset condition exists in the cache, the cache may have to replace a cache line corresponding to a memory whose type is the NVM.

It is discovered by means of analysis that, if a modify flag bit of a cache line is clean, that is, data in the cache line has not been modified and is consistent with data stored in the memory, the data in the cache line does not need to be written back to the memory during replacement; if a modify flag bit of a cache line is dirty, that is, data in the cache line has been modified and is inconsistent with data stored in the memory, the data in the cache line needs to be first written back to the memory during replacement. However, the NVM has a limitation on a quantity of writes. Therefore, when the cache line corresponding to a memory whose type is the NVM has to be replaced, the cache line whose modify flag bit is clean may be preferably replaced, so as to reduce the quantity of writs on the NVM whenever possible.

S209. Select a to-be-replaced first cache line from the cache line that meets the second preset condition, and S205 is executed.

The determining, by the cache, whether a cache line that meets a second preset condition exists in the cache may be specifically:

determining whether a cache line that is corresponding to the memory of the NVM type and whose modify flag bit represents clean exists in first N cache lines in the LRU linked list of the cache, where the first N cache lines are cache lines whose historical access frequencies are lower than the preset frequency; and when the cache line that is corresponding to the memory of the NVM type and whose modify flag bit is clean exists in the first N cache lines in the LRU linked list, selecting, as the first cache line, the first of the determined cache line, which is corresponding to the memory of the NVM type and whose modify flag bit is clean, in the first N cache lines.

In specific implementation, values of M and N may be tuned according to an application behavior. Because delays in replacing cache lines corresponding to memories of different types have the following relationship: DRAM<NVM (clean)<NVM (dirty), time for storing, in the cache, a cache line from the NVM cache may be properly prolonged. Therefore, it may be generally set that N≤M.

S210. The cache selects a cache line with the lowest historical access frequency as the first cache line, and S205 is executed.

Further, when no cache line that meets the second preset condition exists in the cache, a cache line at the most front end of the LRU linked list is the first cache line.

Specifically, if no cache line corresponding to a memory whose type is the NVM type and whose modify flag bit is clean exists in the first N cache lines in the LRU linked list, the cache may determine that the first cache line at the most front end of the LRU linked list is the first cache line. In this case, the determined first cache line is the cache line corresponding to a memory whose type is the NVM type and whose modify flag bit is dirty.

In another embodiment of the present invention, the cache may further record, according to the type of the storage medium that is in the memory and that is indicated by the access address, the type of the memory corresponding to the second cache line.

Specifically, the cache may acquire the type of the memory corresponding to the cache line in the following two implementation manners:

Manner 1: The type of the memory corresponding to the second cache line is determined according to an address range to which the access address belongs in the memory and is recorded.

Specifically, in this manner, physical addresses in a Hybrid Memory are continuous; for example, first n GB is a DRAM, and last n GB is an NVM.

Therefore, the cache may determine whether the access address belongs to a DRAM address range or an NVM address range. If the access address belongs to the DRAM address range, the cache may record that the type of the memory corresponding to the second cache line is the DRAM type; if the access address belongs to the NVM address range, the cache may record that the type of the memory corresponding to the second cache line is the NVM type.

Manner 2: The type of the memory corresponding to the second cache line is determined according to information fed back by a Memory Controller and is recorded.

Specifically, in this manner, a mapping table may be stored in the Memory Controller, where the mapping table records a DRAM address range or an NVM address range, or may record both a DRAM address range and an NVM address range. The address range may be continuous or discontinuous. The Memory Controller may determine a storage location of the access address in a Hybrid Memory according to the access address and the mapping table. In addition, during data exchange between the Memory Controller and the cache, a flag bit may be added, and the Memory Controller may send the storage location of the access address in the Hybrid Memory to the cache by using the added flag bit.

In specific implementation, when a miss occurs, the cache needs to send a data access request to the Memory Controller, where the data access request includes the access address. The Memory Controller may read the to-be-accessed data from the Hybrid Memory according to the data access request, and the Memory Controller may acquire the storage location of the access address in the Hybrid Memory according to the access address and the mapping table. Afterwards, the Memory Controller may send a data read response to the cache, where the data read response includes the to-be-accessed data and the storage location of the access address in the Hybrid Memory. Accordingly, the cache may record, according to the storage location included in the data read response sent by the Memory Controller, the type of the memory corresponding to the second cache line.

The technical solution of the foregoing embodiment is described in detail by using the following two specific examples.

It is assumed that, in a Hybrid Memory, first 2 GB is a DRAM, last 2 GB is an NVM, and a mapping strategy of a cache is associative mapping; a CPU requests data from the cache, an access address is 0x08000000, the access address is located in the first GB of the Hybrid Memory, and a data bus has 32 bits.

Example 1

After a local search, if the cache finds no corresponding data, which indicates that a miss occurs, the cache searches first 5 cache lines in an LRU linked list, and determines, according to location flag bits of the first 5 cache lines, that no cache line corresponding to a memory whose type is a DRAM is found. Afterwards, if the cache checks modify flag bits of first 3 cache lines in the LRU linked list and finds that the modify flag bit of the second of cache lines is 0, which indicates clean, the cache line is a to-be-replaced first cache line. The cache may read a cache line including data whose access address is 0x08000000 into the cache to replace the first cache line, and return the read data to a CPU. In addition, the cache may determine, according to the access address (0x08000000), that the data is stored in the DRAM. Therefore, the cache adds the newly read cache line, that is, a second cache line, to a tail of the LRU linked list, sets a location flag bit of the cache line to 0 (which represents that the second cache line comes from the DRAM), and sets a modify flag bit to 0 (which represents that data in the second cache line has not been modified).

Example 2

After a local search, if the cache finds no corresponding data, which indicates that a miss occurs, the cache searches first 5 cache lines in an LRU linked list, and determines, according to location flag bits of the first 5 cache lines, that a cache line corresponding to a memory whose type is a DRAM is found and the cache line is a to-be-replaced first cache line. If a modify flag bit of the DRAM is 1 (which represents that data in the first cache line has been modified), the cache writes back the data in the first cache line first, and then, the cache may read a cache line including data whose the access address is 0x08000000 into the cache to replace the first cache line, and return the read data to a CPU. In addition, the cache may determine, according to the access address (0x08000000), that the data is stored in the DRAM. Therefore, the cache adds the newly read cache line, that is, a second cache line, to a tail of the LRU linked list, sets a location flag bit of the cache line to 0 (which represents that the second cache line comes from the DRAM), and sets a modify flag bit to 0 (which represents that data in the second cache line has not been modified).

It can be seen from the foregoing process that, in this embodiment of the present invention, when a cache is determining a to-be-replaced cache line, a cache line corresponding to a memory whose type is a DRAM is preferably replaced, so that a cache line corresponding to a memory whose type is an NVM is retained whenever possible, to avoid a delay in reading data from the NVM. When no cache line corresponding to a memory whose type is the DRAM can be replaced, a cache line corresponding to a memory whose type is the NVM and whose modify flag bit is clean is preferably replaced, to reduce a quantity of writes on the NVM whenever possible and prolong a life span of the memory.

Figure 3:
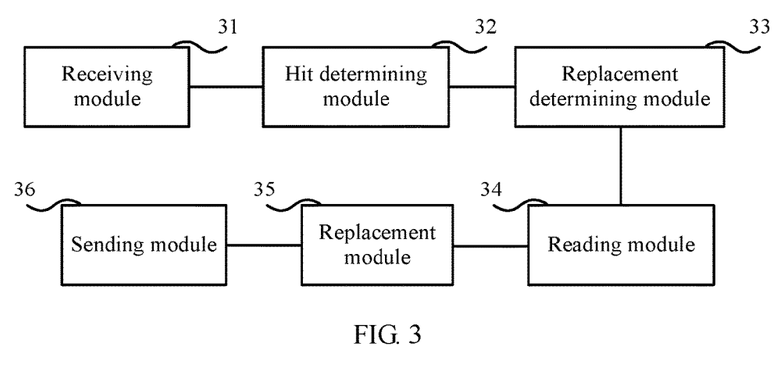
FIG. 3 is a schematic structural diagram of a cache according to an embodiment of the present invention.

FIG. 3 is a schematic structural diagram of a cache according to an embodiment of the present invention. As shown in FIG. 3, the cache in this embodiment may include:

a receiving module 31, configured to receive a data access request sent by a CPU, where the data access request includes an access address;

a hit determining module 32, configured to determine, according to the access address, whether to-be-accessed data is cached in the cache;

a replacement determining module 33, configured to: when the to-be-accessed data is not cached in the cache, determine, according to a historical access frequency of a cache line in the cache and a type of a memory corresponding to the cache line, whether a cache line that meets a first preset condition exists in the cache, where the cache line that meets the first preset condition includes a cache line whose historical access frequency is lower than a preset frequency and that is corresponding to a memory of a dynamic random access memory DRAM type, and the memory includes the memory of the DRAM type and a memory of a nonvolatile memory NVM type; and select, when the cache line that meets the first preset condition exists in the cache, a to-be-replaced first cache line from the cache line that meets the first preset condition;

a reading module 34, configured to read the to-be-accessed data from the memory according to the access address;

a replacement module 35, configured to replace the first cache line with a second cache line, where the second cache line includes the access address and the to-be-accessed data; and a sending module 36, configured to send the to-be-accessed data to the CPU.

Further, the replacement determining module 33 is specifically configured to:

determine whether a cache line corresponding to the memory of the DRAM type exists in first M cache lines in a least recently used LRU linked list of the cache, where the first M cache lines in the LRU linked list are cache lines whose historical access frequencies are lower than the preset frequency; and when the cache line corresponding to the memory of the DRAM type exists in the first M cache lines in the LRU linked list, select, as the first cache line, the first of the determined cache line that is corresponding to the memory of the DRAM type and that is in the first M cache lines.

Further, the replacement determining module 33 is further configured to:

when no cache line that meets the first preset condition exists in the cache, determine whether a cache line that meets a second preset condition exists in the cache, where the cache line that meets the second preset condition includes an unmodified cache line whose historical access frequency is lower than the preset frequency and that is corresponding to the memory of the NVM type; and select, when the cache line that meets the second preset condition exists in the cache, the to-be-replaced first cache line from the cache line that meets the second preset condition.

Further, the replacement determining module 33 is specifically configured to:

determine whether a cache line that is corresponding to the memory of the NVM type and whose modify flag bit represents clean exists in first N cache lines in the LRU linked list of the cache, where the first N cache lines are cache lines whose historical access frequencies are lower than the preset frequency; and when the cache line that is corresponding to the memory of the NVM type and whose modify flag bit is clean exists in the first N cache lines in the LRU linked list, select, as the first cache line, the first of the determined cache line, which is corresponding to the memory of the NVM type and whose modify flag bit is clean, in the first N cache lines.

Further, the replacement determining module 33 is further configured to:

when no cache line that meets the second preset condition exists in the cache, determine that a cache line at the most front end of the LRU linked list is the first cache line.

Further, the replacement module 35 is further configured to:

after the first cache line is replaced with the second cache line, record, according to a type of a storage medium that is in the memory and that is indicated by the access address, a type of a memory corresponding to the second cache line.

The cache in this embodiment may be used to execute the technical solution in the foregoing method embodiment, implementation principles and technical effects thereof are similar, and details are not described herein.

An embodiment of the present invention may further provide an embodiment of a computer system. For a schematic structural diagram of the embodiment of the computer system, reference may be made to the architecture shown in FIG. 1. That is, a processor 11 and a hybrid memory 12 are included, where the Processor 11 may include a CPU 111, a CPU cache 112, and a memory controller 113; the Hybrid Memory 12 may include a DRAM 121 and an NVM 122; the Hybrid Memory 12 and the Memory controller 113 may be connected by using a memory bus 13.

The cache 112 may use the structure described in the foregoing embodiment of the cache, and the cache 112 may execute the technical solution in the foregoing method embodiment. Implementation principles and technical effects thereof are similar, and details are not described herein.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, rather than limiting the present invention. The embodiments provided in this specification are merely exemplary. A person skilled in the art may clearly know that, for convenience and conciseness of description, in the foregoing embodiments, the embodiments emphasize different aspects, and for a part not described in detail in one embodiment, reference may be made to relevant description of another embodiment. The embodiments of the present invention, claims, and features disclosed in the accompanying drawings may exist independently, or exist in a combination.

What is claimed is:

1. A data caching method performed by a cache processor, comprising:
   receiving a data access request for accessing a first data from a processor in a computer system, wherein the computer system comprises a hybrid memory comprising a dynamic random access memory (DRAM) and a nonvolatile memory (NVM);
   determining, according to a historical access frequency of a cache line in the cache and a type of a memory corresponding to the cache line, that a plurality of cache lines in the cache meet a first preset condition and the first data is not cached in the cache, wherein the cache lines that meet the first preset condition correspond to the DRAM and each has a historical access frequency that is lower than a preset frequency;
   selecting a first cache line from the cache lines that meet the first preset condition;
   reading the first data from the hybrid memory according to an access address in the access request; and
   replacing the first cache line with a second cache line, the second cache line comprising the first data.

2. The method of claim 1, wherein:
   the determining that a plurality of cache lines in the cache meet the first preset condition comprises determining that the cache lines corresponding to the DRAM are in first M cache lines in a least recently used (LRU) linked list of the cache, each of the first M cache lines being cache lines having a historical access frequency that is lower than the preset frequency, and M being an integer value that is greater than or equal to 2; and
   the selecting the first cache line from the cache lines that meet the first preset condition comprises selecting, as the first cache line, a determined cache line corresponding to the DRAM from the first M cache lines when the cache lines corresponding to the DRAM are in the first M cache lines.

3. The method of claim 2, wherein the determining that the cache lines corresponding to the DRAM are in the first M cache lines comprises determining, according to a location flag bit of each of the first M cache lines in the cache, whether the cache lines corresponding to the DRAM are in the first M cache lines, the location flag bit of the each of the first M cache lines indicating whether a memory corresponding to the each cache line is the DRAM or the NVM.

4. The method of claim 1, further comprising recording, according to a memory corresponding to the access address, a type of the memory corresponding to the second cache line in a location flag bit of the second cache line.

5. A data caching method performed by a cache processor, comprising:
   receiving a data access request for accessing a first data from a processor in a computer system including a hybrid memory, the data access request comprising an access address, and the hybrid memory comprising a dynamic random access memory (DRAM) and a nonvolatile memory (NVM);
   determining, according to a historical access frequency of a cache line in the cache and a type of a memory corresponding to the cache line, that a plurality of cache lines that meet a first preset condition are not in the cache and the first data is not cached in the cache, the cache lines that meet the first preset condition corresponding to the DRAM and each having a historical access frequency that is lower than a preset frequency;
   determining a plurality of cache lines that meet a second preset condition are in the cache, the cache lines that meet the second preset condition comprising a plurality of unmodified cache lines corresponding to the NVM and each having a historical access frequency that is lower than the preset frequency;
   selecting a first cache line from the cache lines that meet the second preset condition;
   reading the first data from the hybrid memory according to the access address; and
   replacing the first cache line with a second cache line, the second cache line comprising the first data.

6. The method of claim 5, wherein the determining the cache lines that meet a first preset condition are not in the cache comprises:
   determining the cache lines corresponding to the DRAM are not in first M cache lines in a least recently used (LRU) linked list of the cache, each of the first M cache lines being cache lines having a historical access frequency that is lower than the preset frequency, and M being an integer value that is greater than or equal to 2.

7. The method of claim 6, wherein the determining the cache lines corresponding to the DRAM are not in the first M cache lines comprises determining, according to a location flag bit of each of the first M cache lines in the cache, the cache lines corresponding to the DRAM are not in the first M cache lines, the location flag bit of the each of the first M cache lines indicating whether a memory corresponding to the each cache line is the DRAM or the NVM.

8. The method of claim 7, wherein the determining the plurality of cache lines that meet the second preset condition are in the cache comprises determining the cache lines that correspond to the NVM and comprise a modify flag bit indicating that the cache lines are unmodified are in first N cache lines in the LRU linked list of the cache, the first N cache lines being cache lines that each have a historical access frequency that is lower than the preset frequency, N being an integer value that is greater than 0 and less than M;
wherein the selecting the first cache line from the cache lines that meet the second preset condition comprises selecting, as the first cache line, a determined cache line corresponding to the NVM and comprising the modify flag bit indicating that the cache line is unmodified from the first N cache lines.

9. The method of claim 5, further comprising determining that a cache line at the most front end of the LRU linked list is the first cache line when the cache lines that meet the second preset condition are not in the cache.

10. The method of claim 5, further comprising recording, according to a memory corresponding to the access address, a type of the memory corresponding to the second cache line in a location flag bit of the second cache line.

11. A computer system, comprising:
a processor,
a hybrid memory comprising a dynamic random access memory (DRAM) and a nonvolatile memory (NVM);
a cache comprising a cache processor coupled to the processor in the computer system and the hybrid memory, the cache processor configured to:
receive a data access request for accessing a first data from the processor, the data access request comprising an access address;
determine, according to a historical access frequency of a cache line in the cache and a type of a memory corresponding to the cache line, whether cache lines in the cache meet a first preset condition when the first data is not cached in the cache, the cache lines that meet the first preset condition corresponding to the DRAM and each having a historical access frequency that is lower than a preset frequency and;
select a first cache line from the cache lines that meet the first preset condition when the cache lines that meet the first preset condition are in the cache;
read the first data from the hybrid memory according to the access address; and
replace the first cache line with a second cache line, the second cache line comprising the first data.

12. The computer system of claim 11, wherein the cache processor is configured to:
determine whether the cache lines corresponding to the DRAM are in first M cache lines in a least recently used (LRU) linked list of the cache, each of the first M cache lines being cache lines having a historical access frequency that is lower than the preset frequency, and M being an integer value that is greater than or equal to 2; and
select, as the first cache line, a determined cache line corresponding to the DRAM from the first M cache lines when the cache lines corresponding to the DRAM are in the first M cache lines.

13. The computer system of claim 12, wherein the cache processor is configured to determine, according to a location flag bit of each of the first M cache lines in the cache, whether the cache lines corresponding to the DRAM are in the first M cache lines in the LRU linked list of the cache, the location flag bit of the each of the first M cache lines indicating whether a memory corresponding to the each cache line is the DRAM or the NVM.

14. The computer system of claim 12, wherein the cache processor is further configured to:
determine whether a plurality of cache lines in the cache meet a second preset condition when the cache lines that meet the first preset condition are not in the cache, the cache lines that meet the second preset condition comprising unmodified cache lines that correspond to the NVM and each having a historical access frequency that is lower than the preset frequency; and
select the first cache line from the cache lines that meet the second preset condition when the cache lines in the cache meet the second preset condition.

15. The computer system of claim 14, wherein the cache processor is configured to:
determine whether the cache lines that correspond to the NVM and comprise a modify flag bit indicating that the cache lines are unmodified are present in first N cache lines in the LRU linked list of the cache, the first N cache lines being cache lines that each have a historical access frequency that is lower than the preset frequency, N being an integer value that is greater than 0 and less than M; and
select, as the first cache line, a determined cache line corresponding to the NVM and comprising the modify flag bit indicating that the cache line is unmodified from the first N cache lines when the cache lines corresponding to the NVM and comprising the modify flag bit are in the first N cache lines.

16. The computer system of claim 15, wherein the cache processor is further configured to determine that a cache line at the most front end of the LRU linked list is the first cache line when the cache lines that meet the second preset condition are not in the cache.

17. The computer system of claim 11, wherein the cache processor is further configured to recording, according to a memory corresponding to the access address, a type of the memory corresponding to the second cache line in a location flag bit of the second cache line.

* * * * *